United States Patent [19]

Beck

[11] Patent Number: 5,435,928
[45] Date of Patent: Jul. 25, 1995

[54] COPOLYMERS FROM α-β-UNSATURATED DICARBOXYLIC ACID ESTERS, AND THEIR USE

[75] Inventor: Heinz Beck, Duren, Germany

[73] Assignee: Akzo Nobel N.V., Arnhem, Netherlands

[21] Appl. No.: 117,474

[22] Filed: Sep. 7, 1993

Related U.S. Application Data

[63] Continuation-in-part of Ser. No. 945,837, Oct. 21, 1992, abandoned, which is a continuation of Ser. No. 893, Jan. 6, 1987, abandoned, which is a continuation of Ser. No. 418,402, Sep. 15, 1982, abandoned.

[30] Foreign Application Priority Data

Sep. 17, 1981 [DE] Germany ............... 31 36 932.4
Jun. 25, 1992 [DE] Germany ............... 32 23 694.8

[51] Int. Cl.$^6$ ............................................. C10M 10/04
[52] U.S. Cl. ................................ 252/560; 526/324; 252/56 R; 252/56 D
[58] Field of Search ............ 526/324; 252/56 R, 56 D

[56] References Cited

U.S. PATENT DOCUMENTS

| | | | |
|---|---|---|---|
| 2,543,964 | 3/1951 | Giammoria et al. | 252/56 |
| 2,615,845 | 10/1952 | Jippiviott et al. | 252/56 |
| 3,314,908 | 4/1967 | Kagan | 260/20.6 |
| 4,192,930 | 3/1980 | Beck et al. | 525/227 |
| 4,526,950 | 7/1985 | Grava | 526/272 |
| 4,931,197 | 6/1990 | Beck et al. | 252/56 |

FOREIGN PATENT DOCUMENTS

| | | | |
|---|---|---|---|
| 254327 | 4/1963 | Australia . | |
| 263011 | 3/1964 | Australia . | |
| 479746 | 11/1974 | Australia | C10L 1/16 |
| 157687 | 12/1980 | Japan | C10M 1/28 |
| 1196226 | 6/1970 | United Kingdom . | |

OTHER PUBLICATIONS

Trans. of Japan 157,687 Dec. 1980.

*Primary Examiner*—Thurman K. Page
*Assistant Examiner*—Peter F. Kulkoski
*Attorney, Agent, or Firm*—Louis A. Morris

[57] ABSTRACT

Lubricant or lubricant additives comprising copolymers of α-β-unsaturated dicarboxylic acid esters and α-olefins. When the olefin to ester ratio is 0.5 to 4.0 the α-olefins may have 10–16 C-atoms and the α-β-unsaturated dicarboxylic acid is esterified with straight-chain and/or branched monoalcohol of 3–10 carbon atoms. When the ratio is less than 2.0 the α-olefin is $C_{16}$ and the esterifying component may be $C_4$–$C_{10}$ alcohol. The copolymers are useful as synthetic lubricating oils, mineral oil additives, lubricant additives and as lubricants for the shaping treatment of thermoplastic plastics.

6 Claims, No Drawings

# COPOLYMERS FROM α-β-UNSATURATED DICARBOXYLIC ACID ESTERS, AND THEIR USE

This application is a continuation-in-part of U.S. Ser. No. 07/945,837 filed Oct. 21, 1992, abandoned which is a continuation of U.S. Ser. No. 07/000,893 filed Jan. 6, 1987, now abandoned, which is a continuation of U.S. Ser. No. 06/418,402 filed Sep. 15, 1982, now abandoned.

BACKGROUND OF THE INVENTION

1. Field of the Invention

The invention concerns copolymers of α-β-unsaturated dicarboxylic acid esters with α-olefins, their production and their use.

2. Description of the Prior Art

Olefin-maleic acid-copolymer derivatives are known from German Offenlegungsschrift DE-OS 2,727,329, which are constructed from olefins with an average of 2–24 carbon atoms and maleic acid and are converted into esters with monovalent alcohols having a chain length from 2–20 carbon atoms in a mole ratio 1:0.5 to 1:2 maleic acid to alcohol. The there described olefin-maleic acid-copolymer derivatives are produced through copolymerization of maleic acid anhydride with α-olefins and subsequent esterification into semi- or diesters. The there described olefin-maleic acid-copolymer derivatives are particularly suitable for the lubricants in the shaping treatment of synthetics, i.e. plastics. These products are semi-solid to solid at room temperature. Their pour point always lies clearly above 0° C.

In other respects, high-molecular copolymers from α-olefins and from α-β-unsaturated dicarboxylic acid esters have been known, for example as hair sprays (AU-PS 254,327) and as agents for the coating of medicines (AU-PS 263,011). These were produced through copolymerization of α-olefins and α-β-unsaturated dicarboxylic acids or acid anhydrides and supplementary esterification of the copolymers, and are wax-like to solid at room temperature.

A copolymer of a $C_{22}$-$C_{28}$-1-olefin and dibehenylmaleate is known from German Offenlegungsschrift DE-OS 1,770,860, and is obtained by polymerization at 150° C. It is described as a wax-like product. It was suggested to mix hydrocarbons with the product, in order to lower the pour point or altogether to improve the flowability.

In DE-OS 1,770,860 it is set forth that the flowability improvement can only be obtained with such esterpolymers in which the number of carbon atoms in the alkyl part of the ester amounts to more than 20.

Flowability improvers for wax-like hydrocarbon oils are described in AU-PS 479,746, which effect a lowering of the pour point of the hydrocarbon-oil. Here also, expressly long side chains for the alcohol component of the dicarboxylic acid esters have been described as unconditionally necessary. The consistency of the product at room temperature is wax-like to solid. The pour point thus here also lies clearly above 0° C.

U.S. Pat. No. 2,615,845 to Lippincott et al. describes a copolymer of an unsaturated dicarboxylic anhydride and various olefins of chain lengths from $C_3$ to $C_{18}$, which can be esterified with alcohols of chain length from $C_2$ to $C_{14}$ ("Lorol B"). Lippincott presents pour point data in its examples, but the measurements given are for a copolymer-test oil mixture, not the pure copolymer itself.

U.S. Pat. No. 3,314,908 to Kagan et al. teaches the use of $C_4$ to $C_9$ olefin in the copolymer and is concerned with the preparation of tough, flexible solids suitable as paint vehicles.

Japanese Publication 157687/1980 (Mitsubishi) discloses copolymers of $C_4$ to $C_{18}$ α-olefins and α-β-unsaturated dicarboxylic acid esterified with $C_1$ to $C_{18}$ alcohols. Mitsubishi shows a pour point as low as $-18°$ C. with a $C_8$ alcohol esterifying agent and α-olefin chain length of $C_{16}$-$C_{18}$. Higher pour points are shown or implied for combinations of other olefins and esterifying alcohols.

U.S. Pat. No. 2,543,964 (Glammaria) discloses copolymers of olefins up to $C_{30}$ chain length and polybasic acids esterified with alcohols having "as few as twelve or perhaps even fewer carbon atoms" but data is not given for any alcohol lighter than $C_{12}$.

The above described prior art illustrates that lubricating oils have been sought for a long time which display a low pour point without additives, and which have a smallest possible viscosity variation over a broadest possible temperature range. However, the prior art does not provide knowledge of a family of particular α-olefins and esterifying alcohols having specific ranges of carbon chain lengths which when used in combination consistently provide desirable low pour points.

SUMMARY OF THE INVENTION

Thus, a primary objective of the present invention is to identify a family of α-olefins and alcohols used to esterify an α-β-ethylenically unsaturated dicarboxylic acid which provide the desirable low pour points when the α-olefins and esterified dicarboxylic acid are copolymerized.

Accordingly, in one embodiment the present invention is a lubricant or lubricant additive comprising a liquid copolymer of (a) at least one α-olefin, and (b) at least one α-β-ethylenically unsaturated dicarboxylic acid diester having an alcohol esterifying component in a molar ratio (a):(b) of (i) from 0.5 to 4, the α-olefin being within the range of from $C_{10}$ α-olefins to $C_{16}$ α-olefins, $C_{16}$ α-olefins, if employed, being employed only in mixture with $C_{10}$ to $C_{14}$ α-olefin, and the esterifying component of the α-β-ethylenically unsaturated diester being within the range of from $C_3$ alcohol to $C_{10}$ alcohol, or (ii) in a molar ratio (a):(b) of less than 2.0 with a $C_{16}$ α-olefin and $C_4$-$C_{10}$ alcohol esterifying component.

DETAILED DESCRIPTION OF THE INVENTION

The preferred α-β-unsaturated dicarboxylic acid esters employed in the invention are the esters of maleic acid, fumaric acid, citraconic acid, mesaconic acid or itaconic acid. However, the esters of maleic acid and fumaric acid are most preferred.

The mole ratio α-olefin to α-β-unsaturated dicarboxylic acid esters amount preferably to between 0.5 and 4, except as otherwise discussed hereinbelow and except when a $C_{16}$ α-olefin is employed in which case such ratio is less than 2.0. The esterifying alcohols may be straight chain and/or branched chain.

It was completely unexpected that the copolymers of the present invention are liquids having highly desirable pour point and viscosity characteristics, and that they more substantially improve the pour point and viscosity characteristics of mineral oils and lubricants than the known high-molecular copolymers of very long-chain $\alpha$-olefins and $\alpha$-$\beta$-unsaturated dicarboxylic acid esters. For example, if the data of Mitsubishi is extrapolated from the above mentioned pour point value of $-18°$ C. where an $\alpha$-olefin chain length of $C_{16}$–$C_{18}$ is employed to an $\alpha$-olefin chain length of $C_{10}$ (still using a $C_8$ alcohol esterifying agent) the indication is the pour point associated with the $C_{10}$ $\alpha$-olefin would be higher than $0°$ C. As will be shown in the following examples, however, the lower chain length $\alpha$-olefins in most cases yield substantially lower pour points to that shown in Mitsubishi.

Preferably, $\alpha$-$\beta$-unsaturated dicarboxylic acid diesters are employed, and in particular, maleic acid diester and/or fumaric acid diester.

Particularly good flow and viscosity characteristics of the copolymers are then obtained, when 0.005 mole/mole monomer to 0.05 mole/mole monomer of peroxide catalyst is added. Preferably, the peroxide catalyst is added portionwise at time intervals. According to a refinement of the invention, the addition of the peroxide catalyst follows in such manner that initially the copolymerization is started through addition of a third of the amount of peroxide catalyst, and the residual amount of peroxide catalyst is added in 8–12 portions. $\alpha$-$\beta$-unsaturated dicarboxylic acid dioctylester and $\alpha$-$\beta$-unsaturated dicarboxylic acid dibutylester are particularly preferred $\alpha$-$\beta$-unsaturated dicarboxylic acid esters. The reaction temperature may be between $140°$ to $210°$ C. and preferably between $160°$ and $200°$ C. Polymerization should be carried out in an inert atmosphere.

In order to arrive at mole ratios of $\alpha$-olefin to $\alpha$-$\beta$-unsaturated dicarboxylic acid ester from 0.5 to 4 in the polymers, the monomers are used in the mole ratio 0.5 to 7.

The copolymers according to the present invention are in themselves useful on the basis of their viscosity behavior, their lubricity and their low pour points as lubricating oils. They can also be used as additives for the adjustment of viscosity behavior and for lowering of the pour point of mineral oils and lubricants.

The copolymers of the present invention are also useful as lubricants for the shaping treatment of thermoplastics.

The liquid state at room temperature of the copolymers of the present invention allows for a very good miscibility with other processing adjuvants. In particular, the copolymers of the present invention can be used to produce stabilizer-lubricant mixtures for the working up of PVC.

In aqueous emulsions the copolymers according to the present invention can serve as a cooling agent for the cutting, machining and other deformations of metal parts.

The novel features which are considered characteristic for the invention are set forth in particular in the appended claims. The invention itself, however, both as to its construction and its method of operation, together with additional objects and advantages thereof, will be best understood from the following examples.

EXAMPLE 1

One mole of di-n-octylmaleate and one mole of $C_{12}$ $\alpha$-olefin were placed in a suitable reaction vessel. The mixture was heated to $160°$ C. and 10 portions of 0.005 mole di-tert-butylperoxide each were added in intervals of about 30 minutes. Thirty minutes after the last peroxide addition a vacuum was established and the nonpolymerized olefin was distilled off. The last of the residual olefin was removed in a thin-layer evaporator.

The ratio of olefin to ester in the copolymer was determined from the oxygen content by elementary analysis.

The viscosity was measured with an Ubbelohde viscosity meter.

The molecular weight was determined by means of gel permeation chromatography.

Determination of the pour point was done according to the specification DIN pr En 6.

Determination of the viscosity index followed according to method B of ISO-Norm 2909.

The term "monomer ratio" should be understood to be the mole ratio of employed $\alpha$-olefin to employed $\alpha$-$\beta$-unsaturated dicarboxylic acid ester.

The term "polymer ratio" refers to the ratio of $\alpha$-olefin to $\alpha$-$\beta$-unsaturated dicarboxylic acid ester in the copolymerizate.

The copolymerizate obtained in the example had a pour point of $-39°$ C. a molecular weight of 2,500 and a viscosity index of 168.

EXAMPLE 2

In a suitable reaction vessel rinsed with nitrogen, 6 moles $C_{10}$-$\alpha$-olefin and 2 moles dibutylmaleate were added and held under nitrogen atmosphere. The mixture was heated to $200°$ C., t-butylhydroperoxide was used as a catalyst, and initially 0.03 mole t-butylhydroperoxide and later 10 0.004 mole portions were added. After the end of polymerization, excess olefin and dibutylmaleate were distilled off in a vacuum at 0.01 mm Hg.

The results with other olefins as well as with the mole ratio 1:1 olefin to dibutylmaleate are summarized in the following Table.

TABLE 1

| Test | Olefin | Monomer Ratio | Polymer Ratio | MW | VI | Pour Point 0° C. |
|---|---|---|---|---|---|---|
| 1A | $C_{10}$ | 3:1 | 1.35 | 1500 | 121 | −29 |
| 1B | $C_{12}$ | 3:1 | 1.85 | 1320 | 139 | −42 |
| 1C | $C_{14}$ | 3:1 | 1.90 | 1400 | 146 | −20 |
| 1D | $C_{16}$ | 3:1 | 1.91 | 1600 | 152 | −9 |
| 1E | $C_{10}$ | 1:1 | 0.96 | 1350 | 127 | −31 |
| 1F | $C_{12}$ | 1:1 | 0.92 | 1320 | 127 | −42 |
| 1G | $C_{14}$ | 1:1 | 0.83 | 1280 | 133 | −32 |
| 1H | $C_{16}$ | 1:1 | 0.94 | 1370 | 132 | −18 |

EXAMPLE 3

Maleic acid esters esterified with various $C_4$–$C_8$ alcohols were copolymerized with $C_{10}$-$\alpha$-olefin and $C_{14}$-$\alpha$-olefin in mole ratios 1:1 and 1:3 under otherwise similar conditions. The results are summarized in Table 2. As a comparison, dimethylmaleate was copolymerized with $C_{10}$-$\alpha$-olefin under the same conditions in ratios 1:1 and 1:3. The results show that the latter copolymers that were produced had unacceptably high pour points and with $C_{14}$-$\alpha$-olefin in the ratio 1:1, one obtains a pour point of $-4°$ C. but a viscosity index of only 69.

TABLE 2

| Test No. | C-Atoms in the Olefin | C-Atoms in the Ester-alcohols | Monomer Ratio | Polymer Ratio | MW | VI | Pour Point 0° C. |
| --- | --- | --- | --- | --- | --- | --- | --- |
| 2A | 10 | 4 | 3 | 1.35 | 1500 | 121 | −29 |
| 2B | 10 | 6 | 3 | 1.10 | 1650 | 152 | −48 |
| 2C | 10 | 8 | 3 | 0.93 | 2300 | 149 | −35 |
| 2D | 10 | 4 | 1 | 0.96 | 1350 | 127 | −31 |
| 2E | 10 | 6 | 1 | 0.85 | 1580 | 150 | −32 |
| 2F | 10 | 8 | 1 | 0.63 | 2000 | 133 | −35 |
| 2G | 14 | 4 | 3 | 1.90 | 1400 | 146 | −20 |
| 2H | 14 | 6 | 3 | 1.58 | 1400 | 147 | −33 |
| 2I | 14 | 8 | 3 | 1.86 | 1750 | 144 | −31 |
| 2K | 14 | 4 | 1 | 0.38 | 1280 | 133 | −32 |
| 2L | 14 | 6 | 1 | 0.77 | 1520 | 135 | −24 |
| 2M | 14 | 8 | 1 | 0.88 | 1880 | 134 | −20 |
| 2V1 | 10 | 1 | 3 | 0.79 | 1500 | 72 | +7 |
| 2V2 | 10 | 1 | 1 | 0.69 | 2800 | — | solid — |
| 2V3 | 14 | 1 | 1 | 0.54 | 1300 | 69 | −4 |

EXAMPLE 4

Corresponding to the manner of operation given in Example 1, octylfumarate and octylmaleate, as well as hexylfumarate and hexylmaleate were copolymerized with $C_{10}$- and $C_{12}$-α-olefins. The results are summarized in Table 3.

TABLE 3

| Test No. | C-Atoms in the α-Olefin | Ester | Monomer Ratio | Polymer Ratio | MW | VI | Pour Point 0° C. |
| --- | --- | --- | --- | --- | --- | --- | --- |
| 3A | 10 | Octyl-Fumarat | 1 | 0.89 | 3250 | 173 | −35 |
| 3B | 10 | Octyl-Maleat | 1 | 0.93 | 2300 | 149 | −35 |
| 3C | 12 | Octyl-Fumarat | 1 | 0.69 | 2350 | 161 | −33 |
| 3D | 12 | Octyl-Maleat | 1 | 0.63 | 2000 | 133 | −35 |
| 3E | 10 | Octyl-Fumarat | 3 | 1.38 | 3000 | 169 | −26 |
| 3F | 10 | Octyl-Maleat | 3 | 1.10 | 1650 | 152 | −48 |
| 3G | 12 | Octyl-Fumarat | 3 | 1.73 | 2300 | 157 | −33 |
| 3H | 12 | Octyl-Maleat | 3 | 1.84 | 1500 | 146 | −38 |

EXAMPLE 5

Thirty-six mole $C_{14}$-$C_{16}$-α-olefin were mixed in a reactor with 2-ethylhexylmaleate, rinsed with nitrogen and heated to 0° C. At intervals of 30 minutes, 11 portions, each 0.08 mole di-t-butylperoxide were added. Thirty minutes after the last peroxide addition, the volatile products were distilled off with increasing vacuum. Further copolymers were produced according to this method, and are summarized with their measured data in Table 4.

TABLE 4

| Test No. | Ester | Monomer Ratio | Polymer Ratio | MW | Pour Point 0° C. |
| --- | --- | --- | --- | --- | --- |
| 4A | 2-ethylhexyl-maleate | 1 | 0.6 | 1500 | −39 |
| 4B | 2-ethylhexyl-maleate | 3 | 1.4 | 1450 | −30 |
| 4C | dibutylmaleate | 1 | 0.78 | 1600 | −29 |
| 4D | 2-ethylhexyl-fumarate | 1 | 0.7 | 1700 | −29 |
| 4E | dibutylfumarate | 1 | 0.7 | 1700 | −23 |

EXAMPLE 6

To ascertain as precise as practical the parameters of the present invention a further series of copolymers was prepared with unbranched α-olefins (except for small amounts of branched and internal olefins which are usually present in commercially available α-olefins) ranging from $C_8$ to $C_{16-18}$ and esterifying alcohols of from $C_2$ to $C_{12}$. The higher chain length alcohols tested were both branched and unbranched and there was no discernable difference in resulting pour point with each type, except where two numbers separated by a (/) are shown, in which case the first number is associated with branched and the second with unbranched.

Each olefin and maleate (esterified maleic acid anhydride) combination (molar ratio 1/1, 2/1 or 3/1) were placed in a suitable reaction vessel under nitrogen atmosphere. At the reaction temperature (in case of $C_8$ olefin 120° C.; otherwise 160° C.) di-tert-butylperoxide (0.05 mol per mol olefin intake) was added in 10 portions within 3 hours. After additional 30 minute stirring at the reaction temperature all unreacted materials were removed in vacuo.

The pour point of each copolymer prepared was measured and the results are summarized in Table 5.

Table 5 shows a very well defined grouping of copolymers having highly desirable pour points of about −20° C. and lower. Beginning with $C_{10}$ olefins ($C_8$ olefins are not included because they are not viable due to their low boiling points), we find the upper limit to be mixtures of $C_{14-16}$ olefins (containing not greater than about 30–35 mole % $C_{16}$ olefin) with esterifying alcohols of $C_3$–$C_{10}$. When the α-olefin:diester ratio is less than 2.0 higher concentrations of $C_{16}$ α-olefin up to essentially pure $C_{16}$-α-olefin may be used in combination with a $C_4$–$C_{10}$ alcohol esterifying component.

The above examples describe and illustrate a well defined family of copolymers not hinted at by the prior art. All copolymers within this family possess acceptably low pour points which are in the overwhelming majority of cases lower than pour points achieved by any prior art copolymers.

TABLE 5

| Alcohol | Olefin | \multicolumn{7}{c}{Pour Points °C.} |
|---|---|---|---|---|---|---|---|---|

| Alcohol | Olefin | $C_8$ | $C_{10}$ | $C_{12}$ | $C_{14}$ | $C_{14-16}$ | $C_{16}$ | $C_{16-18}$ |
|---|---|---|---|---|---|---|---|---|
| $C_{12}$ | (1/1) |  | −15 |  |  | −3 |  |  |
|  | (2/1) |  |  |  |  |  |  |  |
|  | (3/1) |  | −21 |  |  | −3 |  |  |
| $C_{10}$ | (1/1) | −38 | −40 | −35 | −26 | −25 | −18 |  |
|  | (2/1) |  |  |  |  |  |  |  |
|  | (3/1) | −39 | −40 | −30 | −19 | −17 |  |  |
| $C_9$ | (1/1) |  | −30 |  |  | −35 |  |  |
|  | (2/1) |  |  |  |  |  |  |  |
|  | (3/1) |  | −38 |  |  | −28 |  |  |
| $C_8$ | (1/1) | −23/−37 | −35 | −33 | −20 | −39 | −22 | −17 |
|  | (2/1) |  |  |  |  |  | −10 |  |
|  | (3/1) | −24/−36 | −35 | −33 | −20 | −33 | −7 |  |
| $C_6$ | (1/1) | −34 | −32 |  | −24 |  | −20 |  |
|  | (2/1) |  |  |  |  |  |  |  |
|  | (3/1) |  | −48 |  | −33 |  |  |  |
| $C_4$ | (1/1) | −14 | −31 | −42 | −32 | −29 | −18 | −7 |
|  | (2/1) |  |  |  |  |  |  |  |
|  | (3/1) | −19 | −29 | −42 | −20 | −27 | −9 |  |
| $C_3$ | (1/1) | −3 | −20 |  |  | −27 | −14 |  |
|  | (2/1) |  | −32 |  |  |  |  |  |
|  | (3/1) | −8 | −35 |  |  | −25 | −3 |  |
| $C_2$ | (1/1) |  | −9 |  |  | −18 |  | −1 |
|  | (2/1) |  |  |  |  |  |  |  |
|  | (3/1) |  |  |  |  |  |  |  |

While the invention has been illustrated and described as embodied in copolymers from α-β-unsaturated dicarboxylic acid esters, methods for their production as well as their use, it is not intended to be limited to the details shown, since various modifications and structural changes may be made without departing in any way from the spirit of the present invention.

What is claimed as new and desired to be protected by Letters Patent is set forth in the appended claims.

We claim:

1. A lubricant additive comprising a liquid copolymer of (a) at least one α-olefin, and (b) at least one α-β-ethylenically unsaturated dicarboxylic acid diester having an alcohol esterifying component in a molar ratio (a):(b) of from 0.5 to 4, the α-olefin being within the range of from $C_{10}$ α-olefins to $C_{16}$ α-olefins, $C_{16}$ α-olefins, if employed, being employed only in mixture with $C_{10}$ to $C_{14}$ α-olefin, and the alcohol esterifying component of the α-β-ethylenically unsaturated diester being within the range of from $C_3$ alcohol to $C_9$ alcohol, said liquid copolymer having a pour point of about −20° C. or lower and a molecular weight of up to about 3250.

2. The lubricant or lubricant additive of claim 1 wherein said α-β-unsaturated dicarboxylic acid diester is maleic acid ester or fumaric acid ester.

3. The lubricant or lubricant additive of claim 1 wherein said α-olefin is unbranched.

4. The lubricant or lubricant additive of claim 1 wherein said esterifying component is butanol.

5. A method for lubrication comprising applying the liquid copolymer of claim 1 to items to be lubricated.

6. A method of lubrication comprising adding the liquid copolymer of claim 1 to a lubricant composition and applying the lubricant composition to items to be lubricated.

* * * * *